Patented Sept. 8, 1925.

1,553,105

UNITED STATES PATENT OFFICE.

HENRY R. POWER, OF NIAGARA FALLS, NEW YORK, ASSIGNOR TO THE CARBORUNDUM COMPANY, OF NIAGARA FALLS, NEW YORK, A CORPORATION OF PENNSYLVANIA.

BINDER COMPOSITION FOR ABRASIVES AND OTHER MATERIALS AND METHOD OF MAKING SAME.

No Drawing.   Application filed December 11, 1919.   Serial No. 344,181.

*To all whom it may concern:*

Be it known that I, HENRY R. POWER, a citizen of the United States, residing at Niagara Falls, Niagara County, New York, have invented a new and useful Improvement in Binder Compositions for Abrasives and Other Materials and Methods of Making Same, of which the following is a full, clear, and exact description.

I will first describe the process as applied to abrasive compositions, although, as will hereinafter appear, the invention is not limited to such compositions.

Abrasive compositions have been made in the past by binding the abrasive material and a filler with ordinary Portland cement, with or without a pigment. Such compositions may be made by either a dry or a wet process. The dry process consists in moistening the mixture of abrasive grain, filler and Portland cement sufficiently to enable the article to be pressed into shape. The molded article is then dipped in water to cause the final hydration or setting of the cement. The wet or puddling process consists in mixing the abrasive grain, filler and Portland cement with sufficient water to give a mortar which is poured into the mold while in wet condition. In both processes, the articles are allowed to set or harden in ordinary or damp air.

The objections to these methods are the nonhomogeneous structure of the finished article, and the deficiency in the hardness, strength, density and other desirable physical properties. To overcome these objections, therefore, I have invented a new mixture and also a new process for treating it, which mixture and process is as follows.

To dry Portland cement are added an abrasive grain, such as garnet, sand, crystalline alumina, emery, silicon carbide, etc., either singly or as a mixture of the different grains, together with the proper pigment in the form of a dry color and a certain amount of dry hydrated lime chemically known as Ca(OH)$_2$. The amount of hydrated lime which I use varies according to the product to be made by the process. In general, the amount of hydrated lime used runs from 10% to 30% of the amount of Portland cement introduced into the mix. The dry materials, after a thorough mixing in the usual machines applied to this purpose, are then moistened with a sufficient quantity of water to permit of molding. The moistened mix is placed in a mold and pressed into the desired shape, using a hydraulic press or similar device.

The molded article is then ready for its initial setting, which is accomplished by placing in water for a short time. The article or abrasive composition thus initially set must then be given its final treatment, which is the novel part of my invention. The article is placed in an atmosphere of carbon dioxide, either at normal or increased pressures, and allowed to remain several hours. I prefer to treat the article in a closed receptacle at a pressure of thirty pounds per square inch. After this treatment, the article again is placed in water for a short time, again removed and again treated with the gas. This process is repeated until the proper density is secured, which requires several days. The process may, however, be carried out in the wet way as follows: A mortar is made of abrasive grain, hydrated lime, a filler, Portland cement and water, and this mortar is poured into a mold and allowed to undergo its initial set. When strong enough to remove from the mold, the article is treated or artificially aged by carbon dioxide gas, substantially as described above in the dry process.

The carbon dioxide reacts with the calcium hydrate, forming carbonate of lime, or artificial marble, the hardness and structure of which is quite different from that which results when cement alone is used. The water freed from this reaction, viz: 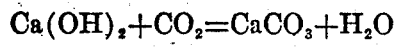

$$Ca(OH)_2 + CO_2 = CaCO_3 + H_2O$$

serves to set the cement "in situ", giving a homogeneous structure of artificial marble and cement. This is shown on the fracture of the finished stone, which is smooth or conchoidal rather than sharp and hackly. The superiority of such an article is shown in its water-resisting qualities. A Portland cement composition made by the ordinary process of setting cement will absorb water when immersed in it. The composition made by the process herein described will show no absorption whatever, or at most very little, absorption, during the same length of time of immersion. This is an advantage because particles of steel or other material freed by the abrading process when the articles are in use do not fill up the pores of the stone, and may be washed off from the surface.

Among the abrasive articles which may be advantageously made by the process herein described are sharpening stones, grinding wheels and also other abrasive devices in which great density, hardness, strength, homogeneity and waterproofing qualities are desired.

I do not limit my invention to the making of Portland cement compositions which are used for abrasive purposes and in which the aggregate consists only of abrasive particles. My invention has a wide application in Portland cement compositions of various descriptions, in which the aggregates may consist of sand, crushed stone, gravel, or any of the ordinary materials commonly used for aggregate. Among these applications are concrete receptacles for holding liquids, structural concrete forms, concrete floors, tile, etc. The term "aggregate", as used in my claims, refers to the material which is bound together by the cement or other binder, whether such a material is an abrasive in character or otherwise.

I claim:

1. The method of making a cement composition, which comprises forming a cement mixture containing calcium hydrate and subjecting the mixture to the action of carbonic acid gas to thereby convert the calcium hydrate into a calcium carbonate.

2. The method of making a cement composition, which comprises forming a cement mixture containing calcium hydrate, shaping an article therefrom, and subjecting the article to the action of carbonic gas to thereby convert a portion of the calcium hydrate into calcium carbonate.

3. The method of making a Portland cement composition, which comprises shaping an article from a mixture containing aggregate, Portland cement and calcium hydrate, and subjecting the article to the action of carbonic acid gas to thereby convert the calcium hydrate into calcium carbonate.

4. The method of making a Portland cement composition, which comprises forming a mixture of aggregate, Portland cement and calcium hydrate, molding the same into the desired form, and subjecting the molded article to the action of carbonic acid gas under pressure to thereby convert the calcium hydrate into calcium carbonate.

5. The method of making a Portland cement composition which comprises forming a mixture of Portland cement, calcium hydrate and abrasive particles, molding the same into the desired form and subjecting the molded article to the action of carbonic acid gas to thereby convert calcium hydrate into calcium carbonate.

6. The method of making a Portland cement composition which consists in forming a cement mixture containing hydrate of lime and abasive particles, molding the same into the desired form and subjecting the molded article to the action of carbonic acid gas to thereby convert calcium hydrate into calcium carbonate.

7. A Portland cement composition comprising aggregate united by a combination of Portland cement binder and calcium carbonate formed in situ by the action of carbonic acid gas on calcium hydrate.

8. A Portland cement composition, comprising abrasive particles, Portland cement and hydrate of lime hardened by the action of carbon dioxide on the hydrated lime.

9. A Portland cement composition, comprising abrasive particles, a Portland cement binder and hydrate of lime, some of the hydrate of lime being converted into carbonate of lime in situ by the action of carbon dioxide and the finished composition being characterized by having such a dense structure that it gives a conchoidal fracture.

10. The method of making articles of a composition, comprising forming a mix of dry Portland cement and abasive particles, together with hydrated lime to about 10% to 30% of the cement, mixing the materials, moistening the mixture and shaping the articles from the moistened mixture, initially setting the shaped articles by the use of water, and then treating the initially set articles in a closed receptacle to the action of carbon dioxide and thereby converting the calcium hydrate into calcium carbonate.

In testimony whereof, I have hereunto set my hand.

HENRY R. POWER.